United States Patent
Kuboduka

[11] Patent Number: 6,123,190
[45] Date of Patent: Sep. 26, 2000

[54] DISC CARTRIDGE STORAGE CASE

[75] Inventor: Masaaki Kuboduka, Tochigi, Japan

[73] Assignee: Sony Corporation, Tokyo, Japan

[21] Appl. No.: 09/359,795

[22] Filed: Jul. 26, 1999

[30] Foreign Application Priority Data

| Jul. 30, 1998 | [JP] | Japan | 10-216064 |
| Feb. 5, 1999 | [JP] | Japan | 11-029103 |

[51] Int. Cl.[7] ............................. B65D 85/57
[52] U.S. Cl. ........................... 206/308.3; 220/837
[58] Field of Search ............... 206/1.5, 232, 308.3, 206/387.1, 493; 220/4.22, 837

[56] References Cited

U.S. PATENT DOCUMENTS

| 4,708,239 | 11/1987 | Bourbon | 206/380.3 |
| 5,385,235 | 1/1995 | Ikebe et al. | 206/308.3 |
| 5,450,952 | 9/1995 | Funawatari | 206/1.5 |
| 5,531,322 | 7/1996 | Iwaki et al. | 206/308.3 |
| 5,782,352 | 7/1998 | Senda | 206/308.3 |
| 5,954,198 | 9/1999 | Ikebe et al. | 206/308.3 |
| 5,960,948 | 10/1999 | Shiga et al. | 206/232 |

*Primary Examiner*—David T. Fidei
*Attorney, Agent, or Firm*—Ronald P. Kananen; Rader, Fishman & Grauer

[57] ABSTRACT

A storage case comprises a case member and a lid member formed integrally with each other. The case member is open at the top and front side thereof. It consists of a bottom plate, lateral walls provided on the bottom plate along opposite lateral sides of the bottom plate, retainers each provided on the inner surface of the lateral wall to be engaged into an engagement cut in a disc cartridge which is to be accommodated into the storage case, and first engagement projections formed on the inner surfaces of the opposite lateral walls. The lid member is supported pivotably on a rear wall of the case member, and consists of a top plate which closes the top opening of the bottom plate of the case member, lateral walls provided on the top plate along opposite lateral sides of the top plate to be parallel to the lateral walls of the case member when the top plate is closed to the top of the case member, and second engagement projections provided on the outer surface of each lateral wall to be engaged on the first engagement projections on the lateral wall of the case member.

20 Claims, 10 Drawing Sheets

DISC CARTRIDGE STORAGE CASE

BACKGROUND OF THE INVENTION

1. Field of the Invention

The present invention relates to a storage case for a disc cartridge in which an optical disc, magneto-optic disc, magnetic disc or the like is enclosed.

2. Description of Related Art

Each of an optical disc cartridge, magneto-optic disc cartridge, magnetic disc cartridge, etc. is a cartridge in which a disc-like recording medium is enclosed. Generally, a disc cartridge not intended for immediate use in a disc player or a disc drive or a one to be carried from one to another place, is put, for storage or carrying, in a case (will be referred to as "storage case" herein). The storage case serves to prevent the cartridge shutter from inadvertently being opened. If the shutter is opened with the disc cartridge being naked, the disc cartridge itself is opened directly to outside so that foreign matter such as dust will easily come into the cartridge through the access aperture for write and read and contaminate the disc surface thus exposed. Also the storage case can protect the disc cartridge against external shock or impact applied to the disc cartridge. If the disc cartridge is dropped carelessly or hit by anything, an impact applied to the disc cartridge will possibly cause the shutter to be damaged and become inoperable. To avoid the above troubles, a disc cartridge not intended for immediate use should desirably be stored in a storage case.

Heretofore, there have been proposed various types of disc cartridge storage cases. FIG. 1 shows a typical one of the conventional disc cartridge storage cases. It is generally indicated with a reference 101. The storage case 101 is formed to have sufficient dimensions to receive a disc cartridge. It consists of an upper half 102 and lower half 103, each formed like a plate. The upper and lower halves 102 and 103 are joined to each other to form the storage case 101. The storage case 101 has an opening 104 defined at the front thereof and through which a disc cartridge is inserted into or taken out of the storage case 101.

The upper half 102 is formed like a generally rectangular plate somewhat larger in size than the plane of the disc cartridge and provided with rising walls 102a, 102b and 102c formed integrally along the circumference thereof except for the front edge thereof for the insertion opening 104. Each of the opposite rising walls 102a and 102b in pair has an engagement projection 105 formed integrally on the outer surface thereof.

The lower half 103 is formed like a generally rectangular plate somehow larger in size than the plane of the disc cartridge and provided with rising walls 103a, 103b and 103c formed integrally along the circumference thereof except for the front edge thereof for the insertion opening 104. Each of the opposite rising walls 103a and 103b in pair has an engagement recess 107 formed in the inner surface thereof. In the lower half 103, there is installed at a rear inner surface portion of each of the rising walls 102a and 102b a catch 108 which is to be engaged into an engagement cut 108 formed on each of side faces of a disc cartridge generally parallel to the inserting direction of the disc cartridge. When a disc cartridge is inserted into the storage case 101, the catches 108 will be engaged into the corresponding engagement cuts of the disc cartridge to retain the disc cartridge in place inside the storage case 101.

The upper and lower halves 102 and 103 are assembled together to form the storage case 101 by sliding and engaging the engagement projections 105 of the upper half 102 into the corresponding engagement recesses 107 of the lower half 103, as will further be described later. Thus, the upper and lower halves 102 and 103 define together a space 106 for receiving a disc cartridge. As shown, each of the upper and lower halves 102 and 103 has a cut 109 formed in the front edge thereof and at which a rear end portion of a disc cartridge put in the reception space 106 can be pinched.

A disc cartridge is inserted into the reception space 106 of the storage case 101 through the insertion opening 104 in the same manner that it is inserted into a disc player or disc drive. Namely, the front end of the disc cartridge is first inserted into the storage case 101. When the disc cartridge is received in the reception space 106, the catches 108 fall into the corresponding engagement cuts 108 of the disc cartridge to retain it in place. The disc cartridge thus put in the storage case 101 can be taken out of the storage case 101 by holding, with fingers, the portion thereof exposed in the cuts 109 of the storage case 101.

Referring now to FIG. 2, there is illustrated another example of conventional disc cartridge storage case. The storage case is generally indicated with a reference 111. The storage case 111 is formed to have sufficient dimensions to receive a disc cartridge. It consists of an upper half 112 and lower half 113, each formed like a plate. The upper and lower halves 112 and 113 are joined to each other to form the storage case 111. The storage case 111 has an opening 114 defined at the front thereof and through which a disc cartridge is inserted into or taken out of the storage case 111.

The upper half 112 is formed like a generally rectangular plate somewhat larger in size than the plane of the disc cartridge and provided with rising walls 112a, 112b and 112c formed integrally along the circumference thereof except for the front edge thereof for the insertion opening 114. Each of the opposite rising walls 112a and 112b in pair has a rail 115 formed integrally on the outer surface thereof. In the upper half 112, there is formed integrally at a rear inner surface portion of each of the rising walls 112a and 112b a catch 118 which is to be engaged into an engagement cut formed on each of side faces of a disc cartridge generally parallel to the inserting direction of the disc cartridge.

The lower half 113 is formed like a generally rectangular plate somehow larger in size than the plane of the disc cartridge and provided with rising walls 113a, 113b and 113c formed integrally along the circumference thereof except for the front edge thereof for the insertion opening 114. Each of the opposite rising walls 113a and 113b in pair has an engagement recess 117 formed in the inner surface thereof. Each of the upper and lower halves 112 and 113 has a cut 119 formed in the front edge thereof and at which a rear end portion of a disc cartridge put in the reception space 116 can be pinched. Also, there is formed integrally on the front edge of the lower half 113 a catch 121 which secures printed sheets of paper 120 which will be placed on the bottom of the lower half 113. The upper and lower halves 112 and 113 are assembled together to form the storage case 101 as follows. Namely, with the rails 115 of the upper half 112 engaged, by sliding, into the corresponding engagement recesses 117 of the lower half 113, the upper and lower halves 112 and 113 are joined to each other, which will further be described later. Thus, the upper and lower halves 112 and 113 define together a space 116 for receiving a disc cartridge.

A disc cartridge is inserted into the reception space 116 of the storage case 111 through the insertion opening 114 in the same manner as when it is inserted into a disc player or disc drive. Namely, the lateral side of the disc cartridge is first inserted into the storage case 111. When the disc cartridge is received in the reception space 116, the catches 118 fall into the corresponding engagement cuts of the disc cartridge to retain it in place. The disc cartridge thus put in the storage case 111 can be taken out of the storage case 111 by holding, with fingers, the portion thereof exposed in the cuts 119 of the storage case 111.

More specifically, the storage case 101 is composed of the upper and lower halves 102 and 103 and the catches 108. The catches 108 are installed to the lower half 103, and thereafter the upper half 102 is assembled to the lower half 103 to form the storage case 101. Also, the storage case 111 consists of the upper and lower halves 112 and 113. The upper half 112 is assembled to the lower half 113 to form the storage case 111. An assembling equipment for these storage case 101 (111) has to include a device for installing the catches 108 to the rear inner surfaces of the rising walls 103a and 103b of the lower half 103, and a device for fixing the upper half 102 (112) to the lower half 103 (113). Thus the assembling equipment as a whole becomes complicated and could not be made smaller. Because it is necessary to join at least the upper half 102 (112) and lower half 103 (113) to each other, the assembling equipment for the storage case 101 (111) cannot attain a further higher productivity.

In the conventional disc cartridge storage case, the disc cartridge is to be introduced into the reception space 106 (116) of the storage case 101 (111) only in one limited direction. Namely, the disc cartridge cannot be inserted into the storage case 101 (111) in any desired direction and thus the storage case 101 (111) cannot conveniently be used.

Moreover, since the printed sheets 120 which will be placed on the bottom of the lower half 113 is secured only by the catch 121, there is a likelihood that the printed sheets 120 will be moved out of place as the disc cartridge is repeatedly inserted and removed into and out of the storage case 101 (111).

SUMMARY OF THE INVENTION

Accordingly, the present invention has an object to overcome the above-mentioned drawbacks of the prior art by providing a disc cartridge storage case comprising a case member and lid member formed integrally with each other, the storage case being thus composed of a reduced number of parts and easy to assemble.

Also, the present invention provides a disc cartridge storage case into and from which a disc cartridge can easily be inserted and removed.

The above object can be attained by providing a disc cartridge storage case comprising, according to the present invention, a case member open at the top and front thereof and which receives a disc cartridge, and a lid member to close the top of the case member and supported pivotably on a rear wall of the case member, the case member and lid member being formed integrally with each other. The case member includes a bottom plate on which a disc cartridge is placed, a pair of opposite lateral walls provided integrally along the opposite lateral edges, respectively, of the bottom plate, a pair of elastically displaceable retainers disposed on the inner opposite surfaces, respectively, of the lateral walls for engagement in engagement cuts formed in the disc cartridge to retain the latter in place, and first engagement projections formed on the inner opposite surfaces, respectively, of the opposite lateral walls. The lid member includes a top plate to close the top of the case member, a pair of opposite lateral walls formed integrally on the opposite lateral edges, respectively, of the top plate and which are generally parallel to the lateral walls of the case member when the top plate covers the top of the case member, and second engagement projections formed on the outer surfaces of the opposite lateral walls for engagement with the first engagement projections.

The storage case thus constructed can be used to accommodate a disc cartridge in two ways. Namely, with the lid member closed to the case member, the disc cartridge can be inserted from a front opening defined by the lid member and case member. With the lid member left open, a disc cartridge can be placed in the case member from the open top thereof. Then, the lid member is closed to the case member and thus the second engagement projections of the lid member are engaged with the first engagement projections of the case member to cover the open top of the case member. The disc cartridge has engagement cuts formed at the front opposite end portions, respectively, thereof with the disc cartridge viewed in the inserted direction thereof. The retainers on the inner surfaces of the opposite lateral walls of the case member are engaged in the engagement cuts, respectively.

Further, the case member includes a pair of guide walls provided inside and generally parallel to the inner surfaces of the opposite lateral walls thereof to guide a disc cartridge which is inserted generally parallel to the bottom plate of the case member. The opposite lateral walls of the lid member are fitted between the opposite lateral walls of the case member and the guide walls. Protective portions to protect the retainers for the disc cartridge are provided at the rear portions, respectively, of the opposite lateral walls of the case member and in the extending direction of the guide walls. For example, the protective portions are formed from protective walls provided as extensions of the guide walls or extensions of the guide walls to the proximity of the retainers.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
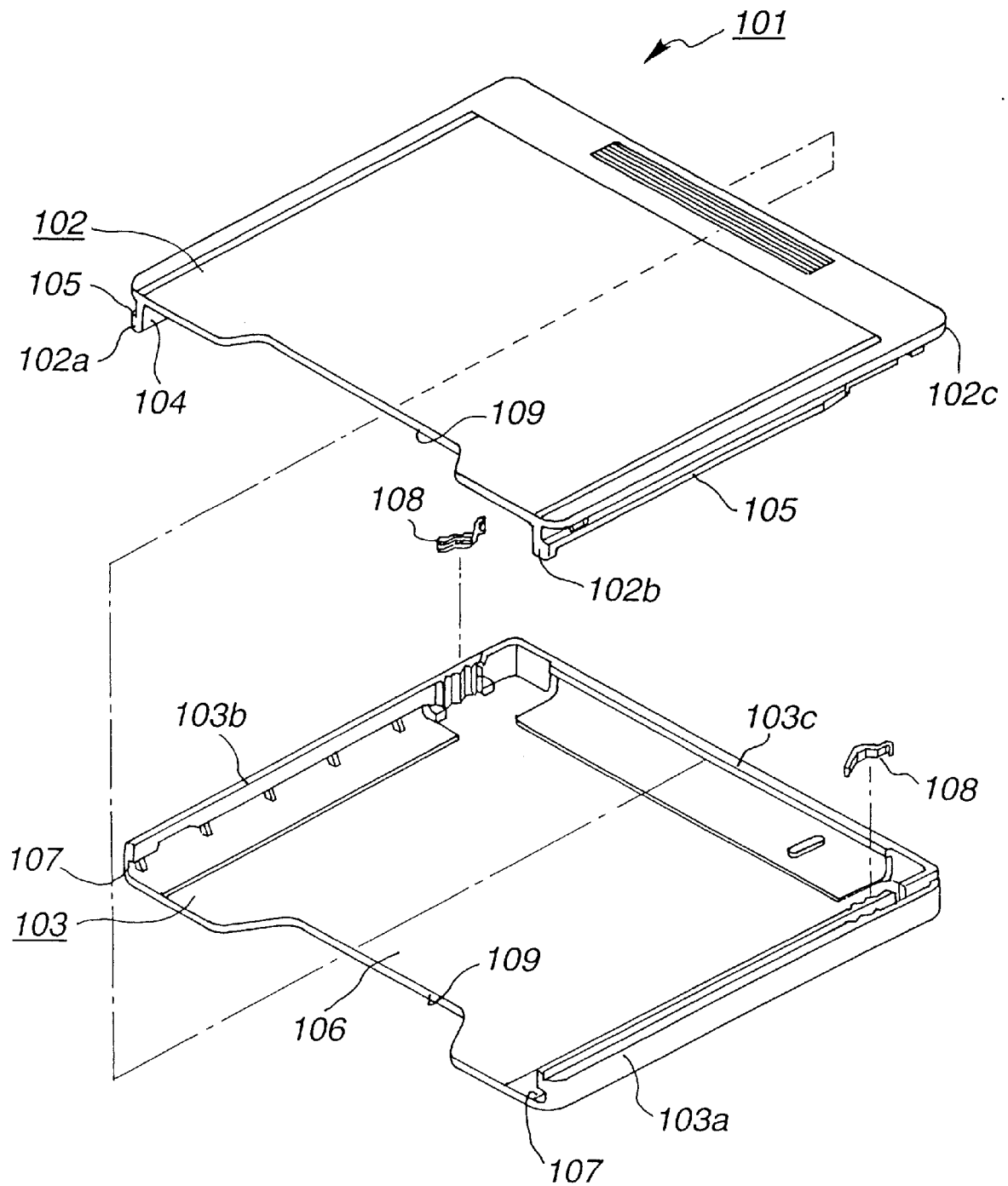
FIG. 1 is a perspective view of an example of conventional disc cartridge storage case.
Figure 2:
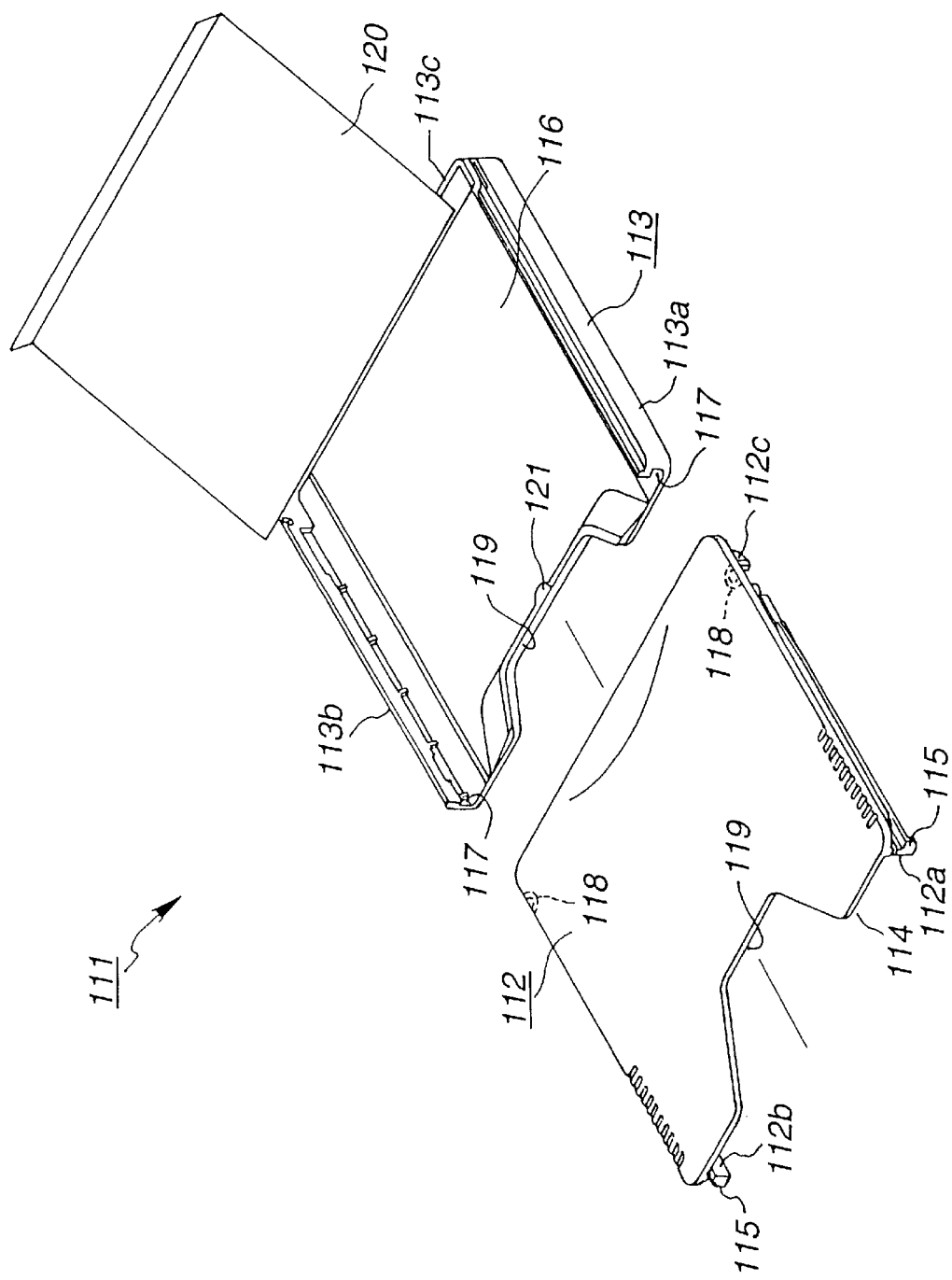
FIG. 2 is a perspective view of another example of conventional disc cartridge storage case.
Figure 3:
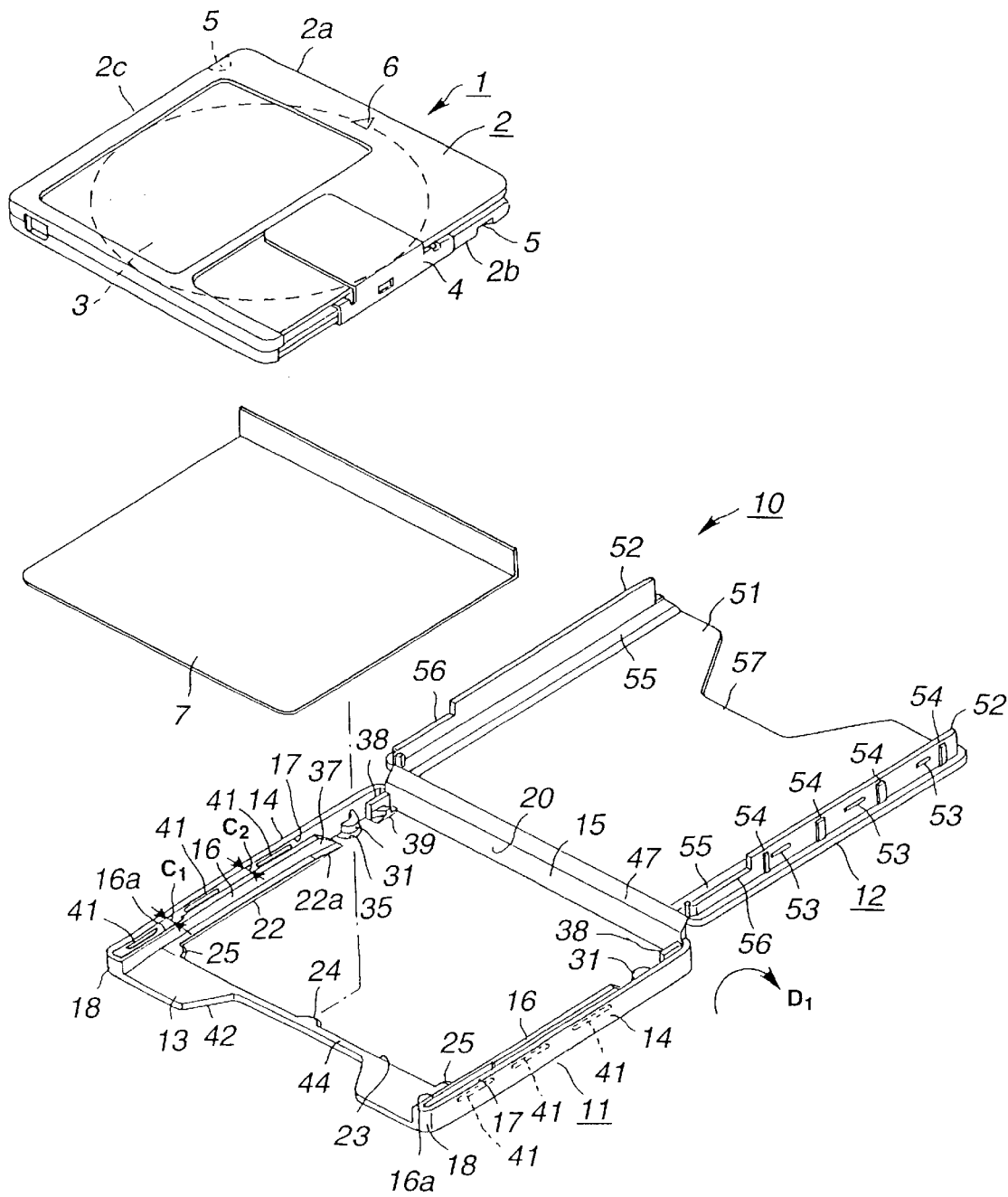
FIG. 3 is a perspective view of a disc cartridge storage case according to the present invention, with a lid member thereof opened away from the top of a case member thereof.
Figure 4:
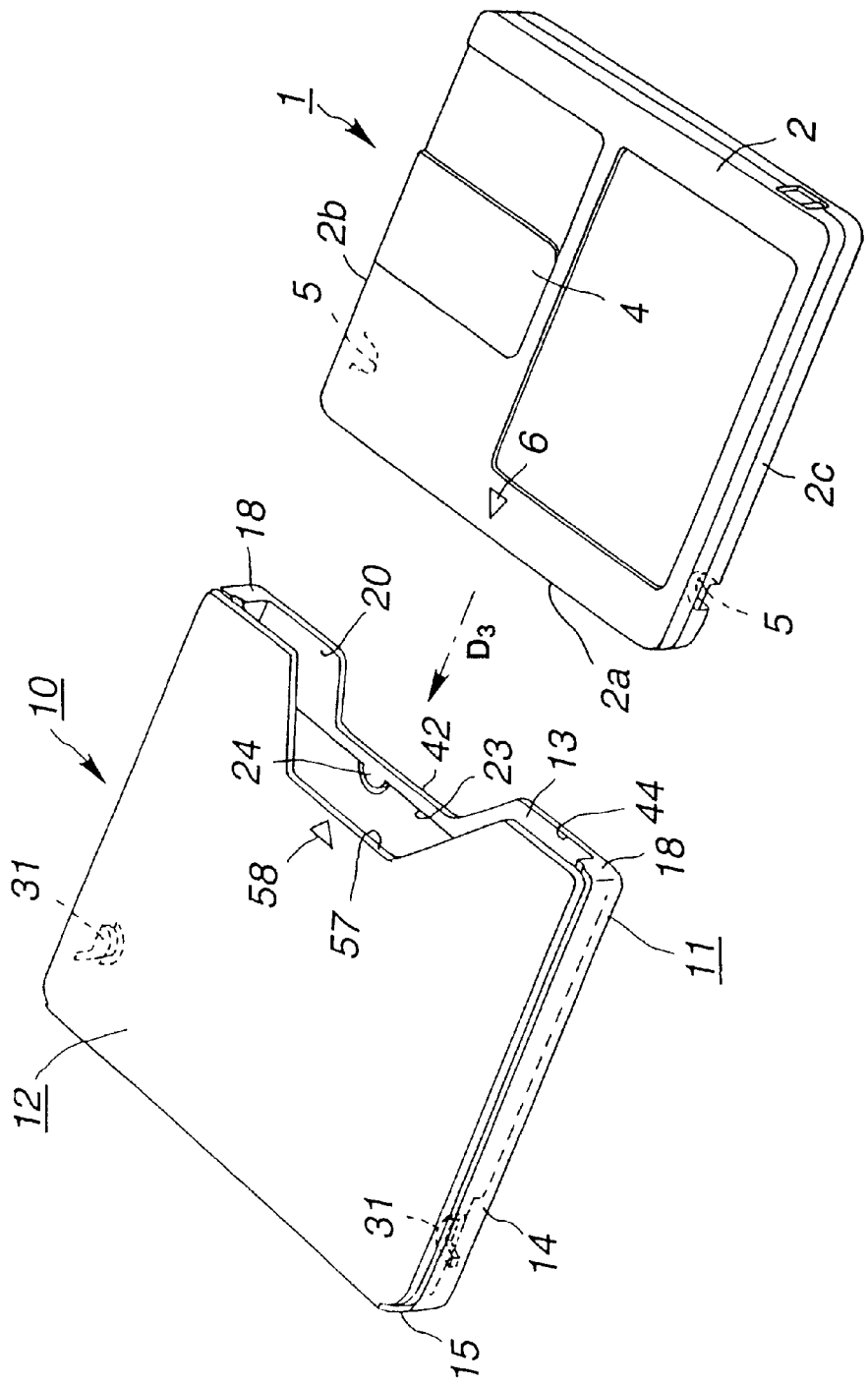
FIG. 4 is a perspective view of the disc cartridge storage case in FIG. 3, with the lid member closed to the top of the case member.

Referring now to FIGS. 3 and 4, there is illustrated a storage case for a disc cartridge having a disc-like recording medium such as an optical disc, magneto-optical disc, magnetic disc or the like encased therein. The disc cartridge and storage case are generally indicate with references 1 and 10, respectively.

As shown in FIGS. 3 and 4, the disc cartridge 1 for storage in the storage case 10 comprises a rectangular body 2 in which a disc-like recording medium 3 such as optical disc, magneto-optical disc or the like (will generically be referred to as "disc" hereinafter) is rotatably encased therein. The cartridge body 2 has write/read apertures (not shown) formed in upper and lower surfaces thereof in an area extending from near the center to a front side 2b perpendicular to one lateral side 2a at which the disc cartridge 1 is to first be inserted into a recording and/or reproducing apparatus to write and/or read signal to and from the disc 3, that is, a disc drive. A radially extending part of the signal recording area on the disc 3 is exposed through the write/read apertures. A shutter 4 to close the write/read apertures is movably provided at the front side 2b of the cartridge body 2. Only when the disc cartridge 1 is set in place in the disc drive, the shutter 4 is moved from the write/read apertures which are thus opened. When the disc cartridge 1 is not used, namely, when it is not in place in the disc drive, the shutter 4 closes the write/read apertures to prevent any foreign matter such as dust from coming into the cartridge body 2. Also the cartridge body 2 has formed in the bottom shell or plate thereof engagement cuts 5 in each of which a part of a disc loading mechanism of the disc drive is to be engaged. Of the engagement cuts 5, one is formed in the front side 2b of the cartridge body 2, and the other is formed in a rear side 2c the cartridge body 2. The rear side 2c is also perpendicular to the above-mentioned lateral side 2a of the cartridge body 2 that is to be first inserted into the disc drive. Also a marking 6 indicating a direction in which the disc cartridge 1 is to be inserted into the disc drive is provided near the lateral side 2a on the upper surface of the cartridge body 2.

The disc cartridge 1 constructed as described above is to be inserted into the disc drive first with the lateral side 2a perpendicular to the front side 2b of the cartridge body 2 on which the shutter 4 is provided, that is, perpendicular to the moving direction of the shutter 4. When the disc cartridge 1 is set in place in a disc write/read unit to write and/or read data to/from the disc 3, the shutter 4 is moved along the front side 2b to uncover the write/read apertures. A writing and/or reading means such as an optical pickup, magnetic head or the like of the disc drive writes and/or read data to/from the disc 3 encased in the cartridge body 2.

As shown in FIGS. 3 and 4, the storage case 10 for reception of the disc cartridge 1 comprises a case member 11 to receive the disc cartridge 1, and a lid member 12 to close the open portion of the case member 11. The case member 11 and lid member 12 are formed integrally with each other. The lid member 12 is supported pivotably on the rear side of the case member 11. The storage case 10 is formed to have a somewhat larger size than the disc cartridge 1. The storage case 10 is formed from a transparent or translucent, flexible synthetic resin such as polypropylene so that sheet of paper 7 carrying information related with the disc cartridge 1 and the disc 3 encased in the disc cartridge 1 can be seen from outside the storage case 10. The disc cartridge 1 can be received in the case member 11 from above with the lid member 12 opened as shown in FIG. 3. Alternatively, the disc cartridge 1 can be received into the case member 11 from the front side of the latter with the lid member 12 closed to the top of the case member 11 as shown in FIG. 4.

As shown in FIG. 3, the case member 11 is formed to have somehow larger dimensions than the main surface of the disc cartridge 1. The case member 1 comprises a bottom plate 13 on which the disc cartridge 1 is placed, a pair of opposite lateral walls 14 formed to rise along opposite lateral sides, respectively, of the bottom plate 13, and a rear wall 15 formed to rise along a rear side perpendicular to the lateral sides of the bottom plate 13. Thus, the bottom plate 13, opposite lateral walls 14 and rear wall 15 of the case member 11 define together a reception space 20 open at the top and front side thereof and in which the disc cartridge 1 is received. The disc cartridge 1 can thus be inserted into the reception space 20 from a place ranging from the front side to just above the bottom plate 13 with the lateral side 2a thereof directed towards the rear side of the case member 11.

Figure 5:
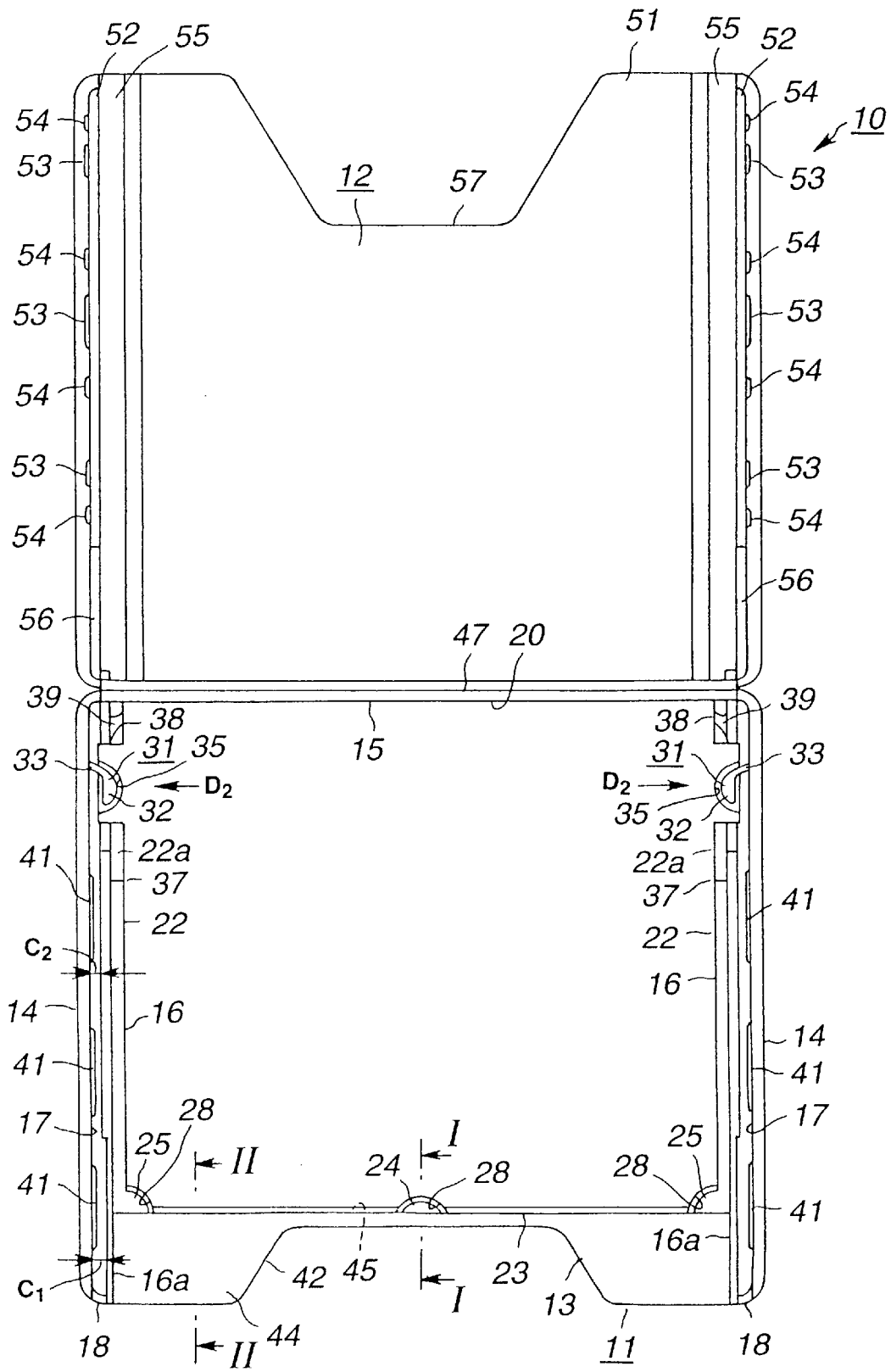
FIG. 5 is a plan view of the disc cartridge storage case in FIG. 3, with the lid member opened away from the top of the case member.

As shown in FIG. 3 or 5, the bottom plate 13 of the case member 11 has formed integrally inside the lateral walls 14 guide walls 16 to guide the disc cartridge 1 introduced generally parallel to the bottom plate 13 from the front of the case member 11. The guide walls 16 are disposed generally parallel to the lateral walls 14 so that there is defined between the lateral wall 14 and guide wall 16 a space 17 into which the lid member 12 can be inserted at a lateral wall 52 thereof Also, each of the guide walls 16 extends from the front of the case member 11 to near catches 31 provided at the rear portion of the case member 11 and which retains the introduced disc cartridge 1 in place. With the top opening of the case member 11 covered and closed with the lid member 12, the front and rear sides 2b and 2c of the introduced disc cartridge 1 abuts the guide walls 16 when the disc cartridge 1 is put in the reception space 20 of the case member 11. That is, the guide walls 16 will serve as a stop for the introduced disc cartridge 1 while guiding the disc cartridge 1 inserted first with the lateral side 2a thereof.

The guide walls 16 are joined to the lateral walls 14 by means of connections 18, respectively, at the front of the case member 11. More particularly, each of the spaces 17 defined by the lateral was 14 and guide wall 16 is formed generally since the lateral wall 14 and guide wall 16 are joined to each other by the connection 18. Therefore, as will be seen from FIGS. 6 and 7, the connection 18 will prevent the lateral wall 52 of the lid member 12 from protruding from the front of the case member 11 even if the lid member 12 is displaced with the lateral walls thereof inserted into the spaces 17, respectively. Thus, the front surface of the case member 11 will feel smooth.

As mentioned above the lateral walls 52 of the lid member 12 are inserted into the spaces 17, respectively, formed by the lateral walls 14 and guide walls 16 of the case member 11. As shown in FIG. 5, each of the guide walls 16 is made thinner at portions 16a thereof opposite to the front portions, respectively, of the lateral walls 14 of the case member 11. The space 17 is formed so that a distance $C_1$ between the lateral wall 14 and guide wall 16 at the near-front portion of the case member 11 where the thin portion 16a of the guide wall 16 is formed is larger than a distance $C_2$ between the lateral wall 14 and guide wall 16 at the near-rear portion of the case member 11. Thus, the thinned portions 16a of the guide walls 16 contribute to a larger elastic displacement of the lateral walls 52 of the lid member 12 inside the spaces 17, which will much more facilitate to pivot the lid member 12 in a direction indicated with an arrow $D_1$ in FIG. 3 to open the top of the case member 11.

Figure 8:
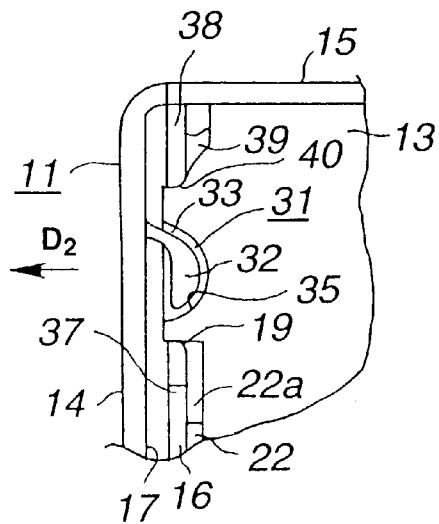
FIG. 8 is a plan view of the essential portion near a catch provided inside the case member of the disc cartridge storage case in FIG. 3.

As will best seen from FIG. 8, each of the guide walls 16 is circularly chamfered at an inner end corner 19 thereof near the rear of the case member 11 to facilitate the removal of the disc cartridge 1. That is to say, owing to the chamfered rear end portion 19 of the guide wall 16, when the disc cartridge 1 is removed from the reception space 20 of the storage case 10, it can be moved smoothly with the lateral edge of the shutter 4 of the disc cartridge 1 not caught by the rear end of the guide wall 16.

Figure 7:
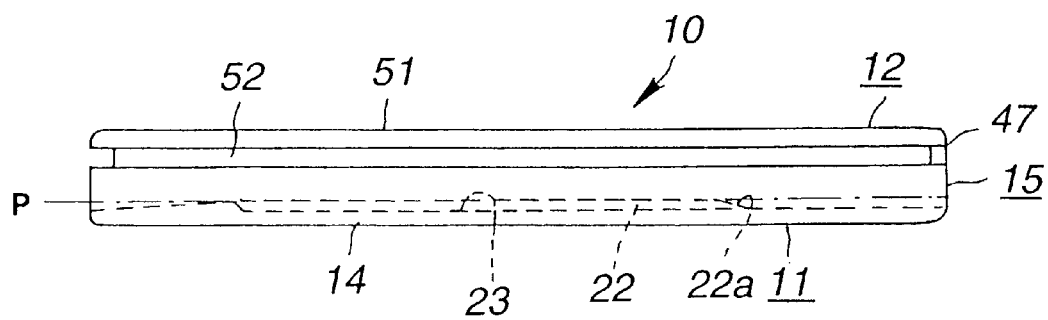
FIG. 7 is a side elevation of the disc cartridge storage case in FIG. 3, with the lid member closed to the top of the case member.

As shown in FIGS. 3 and 5, the bottom plate 13 has further a pair of guide rails 22 provided thereon each along the base end of each of the guide wall 16 to guide the dis cartridge 1 when being inserted into or extracted out of the storage case 10. As shown in FIG. 7, each of the guide rails 22 is formed to be flush at a top surface thereof with a supporting reference plane P in which the disc cartridge 1 is supported in the reception space 20 and also to be in contact with the lower surface of the disc cartridge 1 at the front and rear sides 2b and 2c of the cartridge body 2. Namely, when the disc cartridge 1 is received in the reception space 20, the guide rails 22 will support the disc cartridge 1. Each of the guide rails 22 is cut at a rear end thereof to have a slope 22a descending towards the rear of the case member 11. When the disc cartridge 1 received in the reception space 20 is taken out of the storage case 10, the slope 22a work to prevent the end of the shutter 4 from being caught by the end of the guide rail 22. Thus the disc cartridge 1 can smoothly be removed from the storage case 10.

The bottom plate 13 has formed therein between the guide rails 16 a receiving concavity 23 in which the printed sheets of paper 7 are to be placed. The receiving concavity 23 is formed generally rectangular. The guide rails 22 provide for lateral walls of the receiving concavity 23. The lateral walls of the receiving concavity 23 are generally parallel to the lateral walls 14 of the case member 11. The printed sheets of paper 7 include an index card on which information related with information signal recorded in the disc 3 can be written, and a small leaflet carrying a printed title of recorded information on the disc 3, words of music recorded on the disc 3, or the like.

Figure 9:
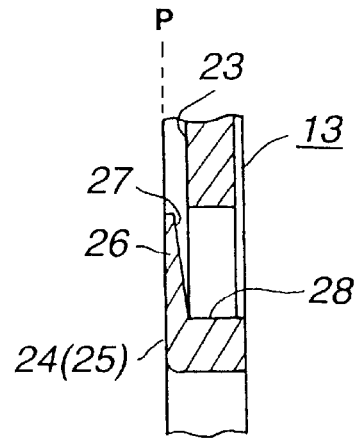
FIG. 9 is a partial sectional view of the disc cartridge storage case taken along the line I—I in FIG. 5.

The case member 11 has formed at the front portion thereof a plurality of catches to secure the printed sheets of paper 7 placed in the receiving concavity 23. More specifically, the bottom plate 13 has formed thereon a first catch 24 at the center of a front edge of the receiving concavity 23, and second catches 25 at front opposite corners of the receiving concavity 23, as shown in FIG. 5. As best shown in FIG. 9, each of the first and second catches 24 and 25 consists of an engagement piece 26 which is to retain the printed sheets of paper 7 and a slit 27 in which the printed sheets of paper 7 are to be inserted. The engagement piece 26 is formed to have a semi-circular shape as well as to be flush at the top surface thereof with the supporting reference plane P as shown in FIG. 7. The slit 27 is defined by the bottom surface of the receiving concavity 23 and engagement piece 26. The printed sheets of paper 7 are placed in the receiving concavity 23 and their lateral edges are retained by the first and second catches 24 and 25. Thus they are restrained from being moved in all directions.

The printed sheets of paper 7 are accommodated in the receiving concavity 23 with no interference with the insertion or removal of the disc cartridge 1 into or out of the storage case 10. Namely, since the printed sheets of paper 7 are laid below the supporting reference plane P for the disc cartridge 1, they will not touch the main surface of the disc cartridge 1 being inserted into or taken out of the storage case 10. The main surface of the disc cartridge 1 will not be damaged by the printed sheets of paper 7. As mentioned above, the second catches 25 formed at the opposite front corners of the receiving concavity 23 will prevent the printed sheets of paper 7, if deflected perpendicularly to the inserted direction of the disc cartridge 1, from touching, at both ends thereof, the disc cartridge 1, so the printed sheets of paper 7 parallel to the inserted direction of the disc cartridge 1 can be protected from being deformed at the lateral edges thereof.

Note that some of the printed sheets of paper 7 are chamfered at the corners thereof as shown in FIG. 3. To cope with such a case, the second catches 25 to retain the corners of such printed sheets of paper 7 are formed larger than the first catch 24 and also large enough to cover such chamfered corners of the printed sheets of paper 7. Further, the bottom plate 13 of the case member 11 has formed therein at positions corresponding to the first and second catches 24 and 25 first semi-circular through-holes 28 to allow air to escape from the reception space 20 as the disc cartridge 1 is inserted into the reception space 20.

As shown in FIGS. 3, 5 and 8, each of the lateral walls 14 is provided with a retainer 31 to secure in place the disc cartridge 1 placed on the bottom plate 13 of the case member 11. The retainer 13 is provided at a rear portion of the lateral wall 14 of the case member 11 to be elastically displaceable. It is formed to protrude from the guide wall 16 inwardly of the case member 11. More particularly, each of the retainers 31 consists of an engagement portion 32 formed integrally with the lateral wall 14 and which is to be engaged in the engagement cut 5 of the disc cartridge 1, and an elastically displaceable portion 33 formed integrally with the lateral wall 14 and having the engagement portion 32 formed at an end thereof The engagement portion 32 is shaped to have a semi-circular form so as to be engaged into the engagement cut 5 of the disc cartridge 1 and it is joined at the one end thereof to the elastically displaceable portion 33. Namely, the elastically displaceable portion 33 supports the engagement portion 32 at the one end thereof Thus the engagement portion 32 overhangs from the elastically displaceable portion 33. When the portion 33 is elastically displaced, the engagement portion 32 is moved towards and away from the lateral wall 14, namely, in the direction of arrow $D_2$ as shown in FIGS. 5 and 8. More specifically, the elastically displaceable portion 33 is elastically displaced as the retainer 32 is pressed by the lateral side 2a of the disc cartridge 1 being inserted, and thus the engagement portion 32 is moved in the direction of arrow $D_2$ in FIGS. 5 and 8.

Figure 10:
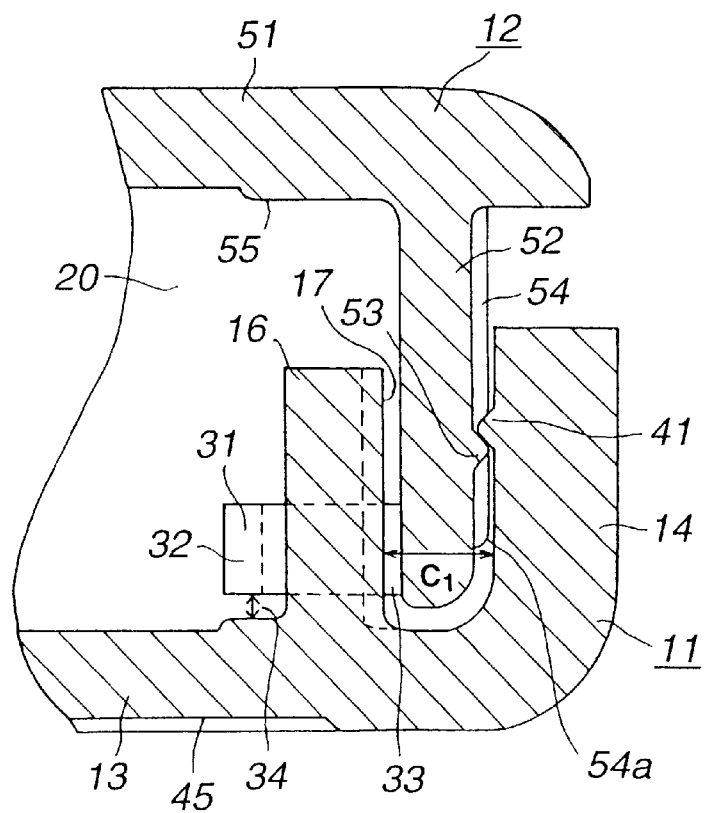
FIG. 10 is a sectional view of the essential portion of the disc cartridge storage case in FIG. 3, with the lid member closed to the top of the case member.

As shown in FIG. 10, the retainer 31 is provided a predetermined distance 34 off the bottom plate 13. Namely, the predetermined distance 34 is such that in addition to the printed sheets of paper 7, a leaflet or the like on which information related to information signal recorded on the disc 3 is printed such as a music words card can be inserted under the retainers 31. That is, when the retainers 31 are engaged in the engagement cuts 5, respectively, formed in the disc cartridge 1, they can hold the disc cartridge 1 in place in the reception space 20 and secure the printed sheets of paper 7 and other printed matter together.

As shown in FIG. 5, the bottom plate 13 has formed therein in positions corresponding to the retainers 31 second through-holes 35, respectively, to allow air to escape from inside the storage case 10 as the disc cartridge 1 is introduced into the storage case 10. As seen, each of the second through-holes 35 is shaped to have a semi-circular form extending from the lateral wall 14 inwardly of the bottom plate 13.

As shown in FIG. 8, each of the retainers 31 is protected by a protective portion 37 of the guide wall 16 that is near the retainer 31. Also each of the retainers 31 is protected by a protective wall 38 provided upright on the bottom plate 13 and perpendicularly to the rear wall 15 of the case member 11. The protective wall 38 is provided in the extending direction of the guide wall 16. The protective portions 37 and protective walls 38 work together to prevent the disc cartridge 1 placed in the reception space 20 from being displaced, and the retainers 31 from being disengaged from the engagement cuts 5 of the disc cartridge 1 and also from being maintained elastically displaced under the pressure of the disc cartridge 1 inserted in the storage case 10.

As shown in FIG. 8, each of the protective walls 38 is chamfered at inner end corner 40 thereof near the retainer 31 to assure a smooth insertion of the disc cartridge 1. Owing to the chamfering of the inner end corners of the protective walls 38, the disc cartridge 1 can smoothly be put into the reception space 20 with the lateral edge of the shutter 4 not caught by the protective walls 38.

Further, as shown in FIG. 8, the case member 11 is provided with stops 39 which the lateral side 2a of the disc cartridge 1 abuts at corners thereof when being inserted into the reception space 20 of the case member 11. Each of the stops 39 is provided near each corner, respectively, of the case member 11, formed by the lateral wall 14 and rear wall 15, and formed generally semi-circular correspondingly to the shape of each corner of the first inserted end of the disc cartridge 1. Moreover, the stop 39 is formed thicker at a portion thereof at the rear end of the bottom plate 13 than at a front end thereof in order to assure a sufficient mechanical strength. Thus, the stops 39 will prevent the disc cartridge 1 from being moved out of place when the latter is applied with an external strong shock, for example, when the storage case 10 in which the disc cartridge 1 is inserted is dropped carelessly.

As shown in FIGS. 3 and 5, each of the lateral walls 14 has further a plurality of first engagement projections 41 formed on the inner surface thereof opposite to the guide wall 16, while the lid member 12 has a plurality of second engagement projections 53 formed on the lateral walls thereof When the lid member 12 is closed to the case member 11 to cover the top opening of the latter, the second engagement projections 53 are engaged on the first engagement projections 41, whereby the lid member 12 is kept closed to the case member 11.

Figure 11:
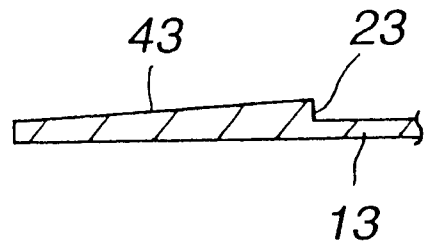
FIG. 11 is a partial sectional view of the disc cartridge storage case in FIG. 3, taken along the line II—II in FIG. 5.

As will be seen from FIGS. 3 and 5, the bottom plate 13 of the case member 11 is cut as indicated with a reference 42 at the front portion thereof correspondingly to a part, near the lateral side 2a, of the disc cartridge 1 received in the reception space 20 of the storage case 10 The lid member 12 has also a cut 57 formed at the front portion thereof correspondingly to the part, near the lateral side 2a of the disc cartridge 1 received in the storage case 10. Namely, the part, near the lateral side 2a, of the disc cartridge 1 is exposed out of the cuts 42 and 57, and it is pinched with fingers when inserting or taking out the disc cartridge 1 from the reception space 20 of the storage case 10. The rest of the bottom case 13 at the front portion of the case member 11 except for the cut 42 is made gradually thinner towards the front end of the case member 11 to provide a slope 43 as shown in FIG. 11. Thus the front portion of the case member 11 forms together with that of the lid member 12 closed to the case member 11 an insertion/removal opening 44 for the disc cartridge 1. The slope 43 contributes to an increased width of the insertion/removal opening 44, whereby the disc cartridge 1 can easily be inserted into the reception space 20 of the storage case 10. Further, the bottom plate 13 has formed on an outer surface thereof a concave area 45 in which a seal or the like carrying markings related with information signal recorded on the disc 3 is to be attached, as shown in FIG. 5. The seal attaching area 45 may be formed largely on the outer surface of the bottom plate 13 by forming the cut 42 in the bottom plate 13 to be smaller than the cut 57 formed in the lid member 12, that is, in a top plate 51 of the lid member 12 that will further be described later.

Figure 6:
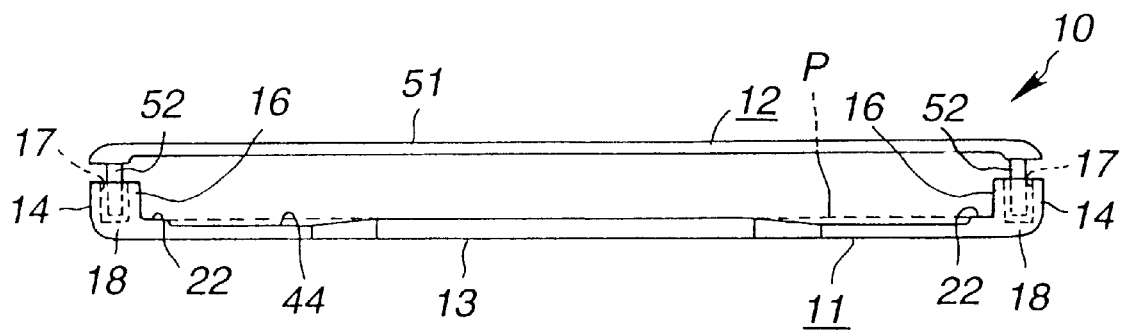
FIG. 6 is a front view of the disc cartridge storage case in FIG. 3, with the lid member closed to the top of the case member.

As shown in FIGS. 6 and 7, in the case member 11 constructed as described in the foregoing, the supporting reference plane P is defined by the guide rails 22 for guiding the disc cartridge 1 when being inserted or removed into or from the storage case 10, the engagement pieces 26 forming the first and second catches 24 and 25, respectively, which retain together the printed sheets of paper 7 placed in the receiving concavity 23, and the base end of the slope 43. When the disc cartridge 1 is placed in the reception space 20, it is supported on the guide rails 22 and engagement pieces 26. Since the disc cartridge 1 received in the space 23 is supported at a position one step higher than the printed sheets of paper 7 received in the concavity 23, it will not touch the printed sheets of paper 7 in the receiving concavity 23. Therefore, the disc cartridge 1 and printed sheets of paper 7 will be prevented from touching and damaging each other as the disc cartridge 1 is inserted or removed into or out of the storage case 10. Also, when the disc cartridge 1 is inserted or removed into or from the storage case 10, the lateral edge of the shutter 4 of the disc cartridge 1 will be prevented from being caught by the step or wall of the concavity 23 in which the printed sheets of paper 7 are received. Thus the disc cartridge 1 can smoothly be inserted or taken out of the storage case 10.

Figure 12:
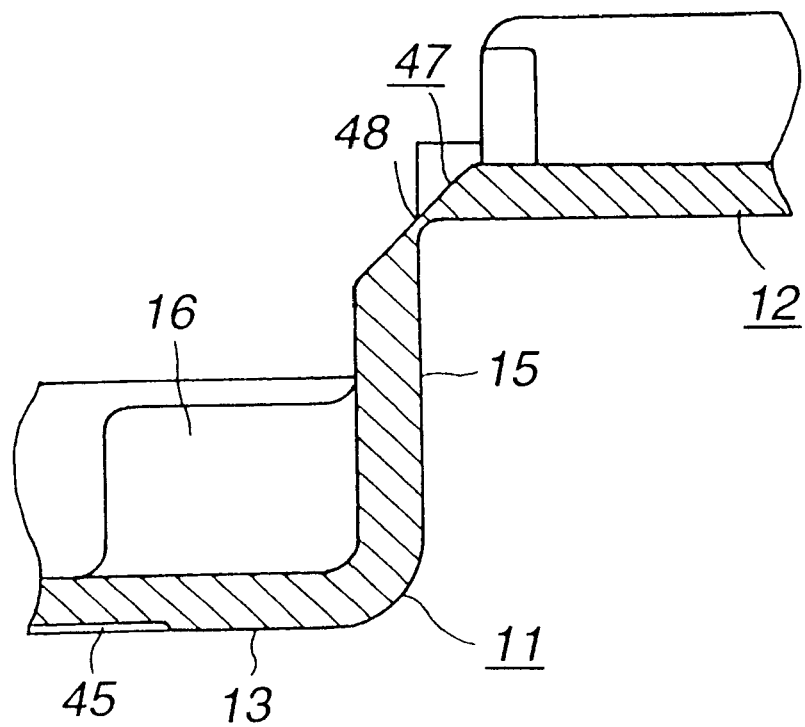
FIG. 12 is a partial sectional view of the essential portion near a hinge of the disc cartridge storage case in FIG. 3.

As will be seen from FIGS. 3, 5 and 12, the lid member 12 is formed integrally with the rear wall 15 of the case member 11 and supported pivotably by a hinge 47. As shown in FIG. 12, the hinge 47 by which the lid member 12 is supported pivotably on the rear wall 15 of the case member 11 has a slope of 45 deg. formed by chamfering an inner top corner of the rear wall 15 and also another slope of 45 deg. formed by chamfering an inner base corner of the top plate 51 of the lid member 12. Thus, when the lid member 12 is closed to the case member 11 to cover the top opening of the latter, the top end of the rear wall 15 of the case member 11 and the base end of the top plate 51 of the lid member 12 can be made to abut each other and the top end of the rear wall 15 of the case member 11 supports pivotably the lid member 12 by means of a linear thin portion 48 resulted from chamfering the top end of the rear wall 15 and the base end of the top plate 15 of the lid member 12 as mentioned above. The thin portion 48 has such a thickness as can support the lid member 12 pivotably on the case member 11. As will be seen, a mold is used to integrally form the case member 11 and lid member 12 as joined to each other by means of the thin portion 48 of the hinge 47.

Figure 13:
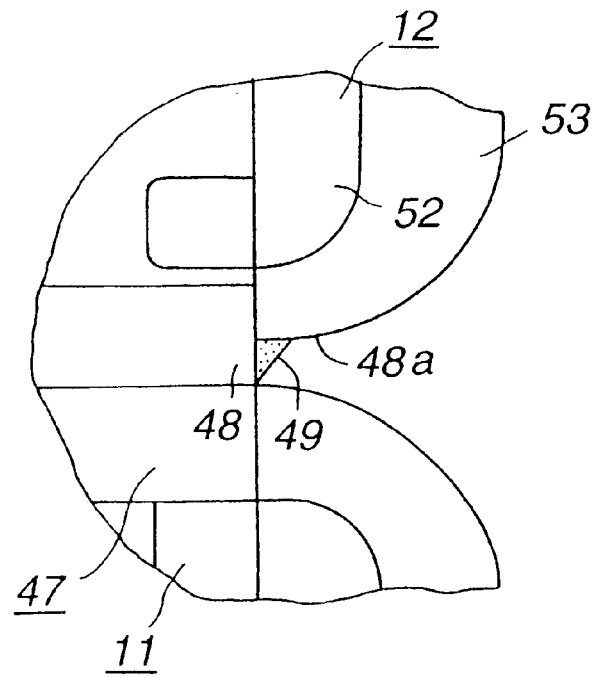
FIG. 13 is a partial sectional view of the essential portion near a hinge of the disc cartridge storage case in FIG. 3, with the lid member opened away from the top of the case member.

The thin portion 48 of the hinge 47 is ended by cuts 48a each of which separates the rear wall 15 of the case member 11 and lateral wall 52 of the top plate 51 of the lid member 12 a very small distance from each other as shown in FIG. 13. The cut 48a is provided to assure a mechanical strength of the mold for the hinge 47 when molding the storage case 10. Either end of the thin portion 48 having the cut 48a has a slope 49 inclined from the thin portion 48 towards the lateral wall of the lid member 12.

Figure 14:
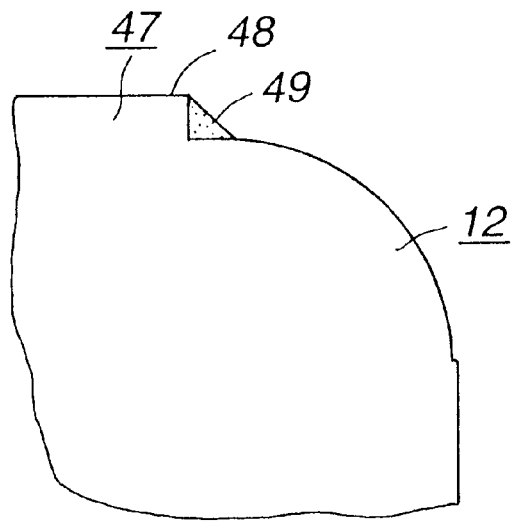
FIG. 14 is a partial sectional view of the essential portion near the hinge of the disc cartridge storage case in FIG. 3, with the lid member closed to the top of the case member.

As mentioned above, the hinge 47 supports the lid member 12 pivotably on the case member 11 by means of the thin portion 48 thereof. As shown in FIG. 14, when the lid member 12 is closed to the case member 11 to cover the top opening of the latter, either end of the thin portion 48 of the hinge 47 provides a smooth corner formed from the slope 49. Therefore, when the user places the finger or the like on the hinge 47, he or she will not feel caught by the end of the hinge 47.

As shown in FIGS. 3 and 5, the lid member 12 supported pivotably on the case member 11 by means of the aforementioned hinge 47 has the lateral walls 52 formed integrally therewith and depending therefrom as viewed with the lid member 12 positioned as closed to the case member 11. The lateral wall is formed somewhat inwardly offset from the lateral edge of the top plate 51 which covers the top opening of the case member 11. As having previously been described, when the lid member 12 is closed to the case member 11, each of the lateral wall 52 is inserted into the space 17 between the lateral wall 14 and guide wall 16 of the case member 11.

Figures 15, 16, 17:
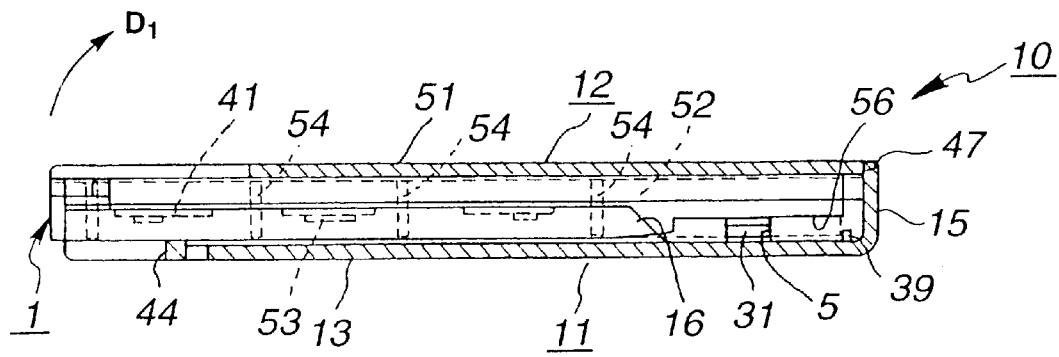
FIG. 15 is a sectional view of the disc cartridge storage case in FIG. 3, in which a disc cartridge is put.
FIG. 16 is a partial sectional view of the essential portion near a hinge of the disc cartridge storage case in FIG. 3, with the lid member being opened away from the top of the case member.
FIG. 17 is a plan view of the essential portion of a variant of the catch for retention of a disc cartridge put in place in the disc cartridge storage case.

As having previously been described, each of the lateral walls 52 has formed on the outer surface thereof the plurality of second engagement projections 53 to maintain the lid member 12 closed to the case member 11, as will be seen from FIGS. 3, 5 and 15. Namely, when the lid member 12 is closed to the top of the case member 11, the second engagement projections 53 are engaged on the plurality of first engagement projections 41 formed on the inner surface of each of the lateral walls 14 of the case member 11. Even if the lateral wall 52 of the lid member 12 is thermally deformed, it is limited from moving by the guide wall 16 when it is inserted into the space 17 between the lateral wall 14 and guide wall 16 of the case member 11. There, the second engagement projections 53 of the lid member 12 will positively be engaged on the first engagement projections 41 of the case member 11. Note that the force of engagement of the second engagement projections 53 on the first engagement projections 41 may be adjusted by varying the length thereof.

As shown in FIG. 3 and 5, each of the lateral walls 52 of the lid member 12 has formed thereon between the second engagement projections 53 a lid inclination preventive projection 54 to prevent the lid member 12 from being inclined excessively when it is pivoted to uncover the top opening of the case member 11. As shown in FIG. 10, the lid inclination preventive projections 54 extend in the height direction of the lateral wall 52, are laid along the length of the lateral wall 52 from the base to free end, and equally thick from the outer surface of the lateral wall 52. Each of the lid inclination preventive projections 54 is generally rounded at the free end thereof and gradually thinned towards the free end to provide a slope 54a. Thus, when the lid member 12 is pivoted to close the reception space 20, the lateral wall 52 can easily be inserted into the space 17 between the lateral wall 14 and guide wall 16 of the case member 11.

When the lid member 12 is pivoted to uncover the top opening of the case member 11, the aforementioned lid inclination preventive projections 54 abut the lateral wall 14 of the case member 11 to prevent the lateral walls 52 of the lid member 12 from being inclined as shown in FIG. 16, thereby allowing the lid member 12 to be smoothly opened. When opened, the lid member 12 will slightly be inclined. However, since the lid inclination preventive projections 54 are formed to have the same thickness as the second engagement projections 53 from the outer surface of the lateral wall 52, they prevent the second engagement projections 53 from being engaged in the inner corner of the lateral wall 14 of the case member 11, and thus the lid member 12 can smoothly be pivoted.

As shown in FIGS. 3 and 5, the top plate 51 has formed thereon along each of the lateral walls 52 thereof a guide rail 55 to guide the disc cartridge 1 being inserted or taken out of the storage case 10. The guide rails 55 are formed thicker than the rest of the top plate 51 and in positions corresponding to the guide rails 22 provided on the case member 11. The guide rails 55 are to be in contact with the front and rear sides 2b and 2c of the disc cartridge 1.

As shown in FIG. 3, each of the lateral wall 52 is cut as indicated at a reference 56 near the hinge 47. The cut 56 provides a clearance to prevent the retainer 31 from colliding with the lateral wall 52 when the lid member 12 is closed to the case member 11. As having previously been described, the top plate 51 of the lid member 12 has formed at the front portion thereof the cut 57 formed through which a part, near the lateral side 2a, of the disc cartridge 1 is exposed for access. The cut 57 is formed larger than the cut 42 formed in the bottom plate 13 of the case member 11. For removing the disc cartridge 1 from the storage case 10, the exposed part, near the lateral side 2a, of the disc cartridge 1 is pinched with fingers and the disc cartridge 1 is drawn out of the reception space 20.

As shown in FIG. 4, there is provided at the front portion of the top plate 51 a marking 58 indicating a direction of inserting the disc cartridge 1. The marking 58 may be an arrow or the like and formed by stamping during molding of the storage case 10 or by printing. The marking 58 provided on the top plate 51 of the lid member 12 will be helpful in allowing the user to recognize the direction of inserting the disc cartridge 1 into the storage case 10. Also, by aligning the marking 6 provided on the disc cartridge 1 with the marking 58 on the top plate 51 of the lid member 12, the disc cartridge 1 can easily be inserted into the storage case 10.

In the storage case 10 constructed as having been described in the foregoing, the case member 11 and lid member 12 are formed integrally with each other using a single mold. The mold is formed so that a molding part for the case member 11, a molding part for the lid member 12, and a molding part for the hinge 47 to have a smaller thickness than the case member 11 and lid member 12 form together a cavity. The bottom plate 13 of the case member 11 and top plate 51 of the lid member 12 are molded to be generally parallel to each other. As shown in FIG. 5, the storage case 10 just molded has the case member 11 and lid member 12 juxtaposed with each other, namely, with the lid member 12 opened flat. The lid member 12 is pivoted in the direction of arrow $D_1$ in FIG. 3 to close the top opening of the case member 11, and the lateral walls 52 of the lid member 12 are inserted into the spaces 17, respectively, between the lateral walls 14 and guide walls 16 of the case member 11 until the first engagement projections 41 are engaged on the second engagement projections 53 as will be seen from FIG. 15, whereby the storage case 10 is assembled. The storage case 10 thus assembled will have at the front thereof the insertion/removal opening 44 for the disc cartridge 1.

Next, how to use the storage case 10 constructed as having been described in the foregoing will be described below:

The disc cartridge 1 may be placed in the reception space 20 of the storage case 10 with the lid member 12 opened from the top of the case member 11 as shown in FIG. 3. Alternatively, the disc cartridge 1 may be accommodated into the storage case 10 by inserting it into the reception space 20 from the front of the storage case 10 with the lid member 12 closed to cover the top opening of the case member 11 as shown in FIG. 4.

First, use of the storage case 10 for accommodating the disc cartridge 1 with the lid member 12 opened from the top of the case member 11 will be described.

As shown in FIG. 3, the disc cartridge 1 is placed into the reception space 20 from a place ranging from the front side to just above the bottom plate 13 first with the lateral side 2a thereof abutted to the stops 39 provided on the bottom plate 13 inside the rear wall 15 of the case member. At this time, the retainers 31 will be engaged into the engagement cuts 5 in the disc cartridge 1.

After that, the lid member 12 is pivoted in the direction of arrow $D_1$ in FIG. 3 to close the top opening of the case member 12. Then, the lateral walls 52 of the lid member 12 are inserted into the spaces 17 between the lateral walls 14 and guide walls 16 of the case member 11, and the first engagement projections 41 of the case member 11 are engaged on the corresponding second engagement projections 53 of the lid member 12 as shown in FIG. 10, whereby the top opening of the case member 11 is closed by the top plate 51 of the lid member 12. Thus, the disc cartridge 1 is accommodated in the storage case 10 as shown in FIG. 15.

The printed sheets of paper 7 can be set in the receiving concavity 23 with the lid member 12 opened to uncover the case member 11. More particularly, before the disc cartridge 1 is placed on the bottom plate 13 of the case member 11, the printed sheets of paper 7 are placed inside the receiving concavity 23 and inserted under the first and second catches 24 and 25. The printed sheets of paper 7 are thus accommodated in the storage case 10. At this time, even if the printed sheets of paper 7 are naturally deflected, the first catch 24 formed at the central front edge of the receiving concavity 23 and second catches 25 formed at the front opposite corners of the receiving concavity 23 can keep flat the printed sheets of paper 7 in the receiving concavity 23 and thus prevent the corners of the printed sheets of paper 7 from touching and damaging the disc cartridge 1. Thereafter, the disc cartridge 1 is placed on the bottom plate 13 and lid member 12 is pivoted to close the top opening of the case member 11. Thus, the disc cartridge 1 is accommodated in the storage case 10.

Next, use of the storage case 10 for accommodating the disc cartridge 1 into the reception space 20 with the lid member 12 closed to cover the top opening of the case member 11 by insertion from the front of the storage case 10, will be described.

As shown in FIG. 4, the disc cartridge 1 is inserted in the direction of arrow $D_3$ in FIG. 4 first with the lateral side 2a thereof (at which the disc cartridge 1 is to be inserted into the disc drive) from the insertion/removal opening 44 of the storage case 10 with the lid member 12 closed to cover the top opening of the case member 11. Then, the engagement portions 32 of the retainers 31 are pressed by the lateral side 2a of the disc cartridge 1, so that the elastically displaceable portions 33 are elastically deformed and the engagement portions 32 are engaged into the engagement cuts 5 of the disc cartridge 1. Thus, the disc cartridge 1 is retained received in the reception space 20 as shown in FIG. 15. At the same time, the opposite corners of the lateral side 2a of the disc cartridge 1 but the stops 39.

As the disc cartridge 1 is inserted in the direction of arrow $D_3$ in FIG. 4, it will be guided by the guide rails 22 of the case member 11 and those 55 of the lid member 12 into the reception space 20 of the storage case 10. Since the lid member 12 of the storage case 10 is closed to cover the top opening of the case member 11, the reception space 20 is formed as a closed space. However, since the first and second through-holes 28 and 35 are formed in the bottom plate 13, air compressed as the disc cartridge 1 is inserted is allowed to escape through the first and second through-holes 28 and 35, so the disc cartridge 1 can be lightly inserted into storage case 10.

As previously described, the protective walls 38 on the bottom plate 13 are chamfered as indicated with references 40 at the inner end corners thereof near the retainers 31. Therefore, the disc cartridge 1 can smoothly be inserted into the reception space 20 with the lateral edge of the shutter 4 not caught. Further, the front portion of the bottom plate 13 forming the insertion/removal opening 44 is made gradually thinner towards the front of the case member 11 to have the slope 43 as shown in FIG. 11, so the insertion/removal opening 44 is made sufficiently large for easy insertion of the disc cartridge 1.

Once the disc cartridge 1 is accommodated in the storage case 10, it is restricted from being moved in the direction of arrow $D_1$ in FIG. 3 in which it is inserted because the opposite corners of the lateral side 2a of the disc cartridge 1 abut the stops 39 provided on the bottom plate 13, and in a direction perpendicular to the inserting direction $D_1$ because the front and rear sides 2b and 2c of the disc cartridge 1 abut the guide walls 16. Thus, disc cartridge 1 is kept in place inside the storage case 10. Therefore, the disc cartridge 1 can be kept against displacement even if the storage case 10 is applied with a shock, for example, when it is dropped or hit to anything carelessly.

The case member 11 is provided with the protective portions 37 and protective walls 38 to protect the retainers 31, respectively. The protective portions 37 and protective walls 38 prevents the disc cartridge 1 accommodated in the reception space 20 from being displaced out of place and also the retainers 31 from being disengaged from the engagement cuts 5 of the disc cartridge 1. In addition, the protective portions 37 and protective walls 38 prevent the retainers 31 from being kept elastically displaced under the pressure of the disc cartridge 1.

Moreover, as shown in FIG. 7, in this storage case 10, when the lid member 12 is closed to cover the top opening of the case member 11, the lateral walls 52 of the lid member 12 are inserted in the spaces 17, respectively, between the lateral walls 14 and guide walls 16 of the case member 11. Since each of these spaces 17 is formed generally like a bag since the lateral wall 14 and guide wall 16 are joined to each other by the connection 18. Therefore, the connection 18 will prevent the lateral wall 52 of the lid member 12 from protruding from the front of the case member 11 even if the lid member 12 is displaced with the lateral walls 52 thereof inserted into the spaces 17, respectively. Thus, the front surface of the case member 11 will feel smooth. As shown in FIG. 14, each of the slopes 49 provided at the opposite ends of the hinge 47 of the storage case 10 smoothes either end of the thin portion 48 of the hinge 47 when the lid member 12 is closed to the case member 11 to cover the top opening of the latter. Therefore, when the user places the finger or the like on the hinge 47, he or she will not feel caught by the end of the hinge 47.

The disc cartridge 1 accommodated in the storage case 10 as mentioned above can be taken out by pinching with fingers the part, near the front side 2a, of the disc cartridge 1 exposed through the cuts 42 and 57 and drawing it out in the direction of arrow $D_3$ in FIG. 4. As the disc cartridge 1 is drawn out, the elastically displaceable portions 33 of the retainers 31 are elastically deformed under the pressure of the edges of the engagement cuts 5 of the disc cartridge 1 until the engagement portions 32 of the retainers 31 are disengaged from the engagement cuts 5 of the disc cartridge 1. Thus the disc cartridge 1 is released and can easily be drawn out of the storage case 10. Also at this time, the disc cartridge 1 is guided by the guide rails 22 of the case member 11 and those 55 of the lid member 12 and removed from the reception space 20.

As shown in FIG. 8, each of the guide walls 16 is circularly chamfered at an inner end corner 19 thereof near the rear of the case member 11. Therefore, when the disc cartridge 1 is removed from the reception space 20 of the storage case 10, it can be moved smoothly with the lateral edge of the shutter 4 of the disc cartridge 1 not caught by the rear end of the guide wall 16.

Alternatively, the disc cartridge 1 can be taken out of the storage case 10 by pivoting the lid member 12 away from the case member 11 to open the top of the latter. As shown in FIG. 15, the lid member 12 can be pivoted from near the lateral walls 52 in the direction of arrow $D_1$ in FIG. 15 in which the lid member 12 can is opened away from the case member 11. Thus, the second engagement projections 53 of the lid member 12 are disengaged from the first engagement projections 41 of the case member 11.

At that time, the lateral walls 52 of the lid member 12 will be deflected somewhat inwardly as shown in FIG. 16. Each of the lateral walls 52 of the lid member 12 has formed thereon the plurality of lid inclination preventive projection 54 to prevent the second engagement projections 54 from being engaged in the inner corners of the lateral walls 14 of the case member 11, thereby allowing the lid member 12 to be pivoted smoothly. Also, as shown in FIG. 5, the thinned portions 16a of the guide walls 16 contribute to a larger elastic displacement of the lateral walls 52 of the lid member 12 inside the spaces 17, which will much more facilitate to pivot the lid member 12 in a direction indicated with an arrow $D_1$ to open the top of the case member 11.

When the lid member 12 of the storage case 10 for the disc cartridge 1, constructed as having been described in the foregoing, is closed to the top of the case member 11, the disc cartridge 1 is to be inserted or removed into or from the storage case 10 from the front insertion/removal opening 44. Alternatively, when the lid member 12 is opened to uncover the top opening of the case member 11, the disc cartridge 1 can be inserted into or removed from the reception space 20 from a place ranging from the front side to just above the bottom plate 13. Thus, the storage case 10 is highly versatile. The case member 11 and lid member 12 can be formed integrally with each other using a single mold. Since the parts of the storage case 10 count only one in number, the molding and assembling are extremely easy, and the assembling equipment can be simplified very much. Furthermore, since the markings provided the storage case 10 and disc cartridge 1, respectively, give a guidance for insertion of the disc cartridge 1, the disc cartridge 1 can correctly be inserted first with the lateral side 2a thereof into the storage case 10 (at which the disc cartridge 1 is to be inserted into the disc drive).

Next, a variant of the retainer 31 will be described below with reference to FIG. 17.

The retainer is indicated with a reference 61. The retainer 61 is formed like a ring and formed integrally on the lateral wall 14 at a position near the rear of the case member 11. It is elastically displaceable in the direction of arrow $D_4$ in FIG. 17. The retainer 61 is projected inwardly of the case member 11 from the guide wall 16 to be engageable in the corresponding engagement cut 5 of the disc cartridge 1. The retainer 61 is provided on the lateral wall 14 with a small clearance 34 relative to the bottom plate 13 similarly to the retainers 31 shown in FIG. 10. A printed matter other than the printed sheets of paper 7 is inserted in the small clearance 34 and retained therein.

In the case of the storage case 10 having the aforementioned retainers 61, when the lid member 12 is closed to the top of the case member 11, the disc cartridge 1 is inserted into or removed from the storage case 1 from the front insertion/removal opening 44 first with the lateral side 2a of the disc cartridge 21 (at which the disc cartridge 1 is to be inserted into the disc drive). At this time, the retainer 61 is elastically deformed under the pressure of the lateral side 2a of the disc cartridge 1 and engaged in the engagement cut 5 of the disc cartridge 1. Thus, the disc cartridge 1 can be held securely in the reception space 20. When the disc cartridge 1 once accommodated in the reception space 20 is removed from there with the lid member 12 closed to the top of the case member 11, the retainers 61 are pressed and elastically deformed by the edges of the engagement cuts 5 of the disc cartridge 1, and disengaged from the cuts 5, so that the disc cartridge 1 can be drawn out of the storage case 10.

The storage case 10 for the disc cartridge 1 according to the present invention has been described concerning the embodiment thereof in the foregoing. However, the present invention is not limited to the embodiment, but it can be applied to a storage case for a disc cartridge for a recording medium such as a magnetic disc, optical disc or the like. The aforementioned storage case 10 has the guide walls 16 for guidance of the disc cartridge 1 being inserted or removed into or from the case member 11, but the guide walls 16 are not always necessary. When no such guide walls 16 are provided, the lateral walls 52 of the lid member 12 may be designed to work for the guide walls 16.

According to the present invention, since the case member and lid member is formed integrally with each other, so they can be molded assembled very easily and the assembling can be done with an extremely simplified equipment. The storage case can also be used with the lid member opened from the case member. In this case, the disc cartridge can be inserted into the reception space from a place ranging from the front side to just above the bottom plate. When the storage case is used with the lid member closed to the top of the case member, the disc cartridge can be inserted into or removed from the reception space. Thus, the storage case according to the present invention has a high versatility.

What is claimed is:

1. A disc cartridge storage case, comprising:

a case member open at the top and front thereof an including a bottom plate opposite the top of said case member on which a disc cartridge is to be received into the front of said case member, a pair of opposite lateral walls formed integrally along opposite lateral sides of the bottom plate, a pair of elastically displaceable retainers provided on inner opposite surfaces of the opposite lateral walls of the bottom plate for engagement into engagement cuts formed in the disc cartridge to retain the latter in place, and first engagement projections formed on the inner opposite surfaces of the opposite lateral walls of the bottom plate; and a lid member pivotably integral with a rear wall, opposite said front, of the case member and including a top plate to close the case member, a pair of opposite lateral walls formed integrally along opposite lateral sides of the top plate and which are generally parallel to the lateral walls of the bottom plate of said case member when the top plate is closed on a top of the case member, and second engagement projections formed on outer surfaces of the opposite lateral walls of said lid member for engagement with the first engagement projections on the inner opposite surfaces of the lateral walls of the bottom plate of the case member.

2. The disc cartridge storage case as set forth in claim 1, wherein the case member further includes a pair of guide walls provided inside and generally parallel to the inner surfaces of the opposite lateral walls thereof to guide the disc cartridge which is inserted generally parallel to the bottom plate of the case member from the front of the case member.

3. The disc cartridge storage case as set forth in claim 2, wherein the pair of guide walls is provided a predetermined distance from the case member so that when the lid member is closed to cover the top of the case member, the lateral walls of the lid member are inserted between the lateral walls and the guide walls of the case member.

4. The disc cartridge storage case as set forth in claim 3, wherein the pair of guide walls is made thinner at the front of the case member so that their distance from the lateral walls of the case member is large.

5. The disc cartridge storage case as set forth in claim 3, wherein the pair of opposite lateral walls of the lid member has formed on an outer surface thereof protective projections to prevent the lateral walls of the lid member from being inclined when the lid member is pivoted in a direction in which it is opened from the top of the case member.

6. The disc cartridge storage case as set forth in claim 2, wherein the lateral walls and guide walls of the case member are joined to each other at the front of the case member.

7. The disc cartridge storage case as set forth in claim 2, wherein the inner ends of the guide walls are chamfered at an inner portion of the rear wall of the case member.

8. The disc cartridge storage case as set forth in claim 2, wherein a pair of guide rails is formed on the bottom plate of the case member to guide the disc cartridge being inserted generally parallel to the bottom plate from the front of the case member.

9. The disc cartridge storage case as set forth in claim 8, wherein each of the guide rails is gradually made thinner towards the rear wall of the case member to form a slope.

10. The disc cartridge storage case as set forth in claim 1, wherein each of the retainers consists of an elastically displaceable portion provided on the lateral wall of the case member and an engagement portion extending from an end of the elastically displaceable portion to be engaged in the engagement cuts in the storage case.

11. The disc cartridge storage case as set for the in claim 1, wherein there is provided on the bottom plate of the case member at the rear wall thereof abutments to which at least both corners of an inserted end of the disc cartridge abut when the disc cartridge is inserted into the storage case.

12. The disc cartridge storage case as set forth in claim 2, wherein there are provided on the bottom plate of the case member in the extending directions of the guide walls protective portions to protect the retainers.

13. The disc cartridge storage case as set forth in claim 12, wherein the protective portions are chamfered at inner corners thereof across the retainers.

14. The disc cartridge storage case as set forth in claim 1, wherein there are provided at the front of the bottom plate of the case member catches to fix at least one sheet of paper placed on the bottom plate.

15. The disc cartridge storage case as set forth in claim 14, wherein the bottom plate of the case member has formed therein a concavity for receiving the at least one sheet of paper retained by catches formed generally at the front, a center, and corners of the concavity in the bottom plate of the case member while the catches at the corner are formed larger than the catches at the center.

16. The disc cartridge storage case as set forth in claim 1, wherein the retainers are provided with a small space from the bottom plate of the case member, the small space being such that at least one sheet of paper can be inserted between the bottom plate and said retainers.

17. The disc cartridge storage case as set forth in claim 1, wherein the case member is gradually thinned at the front thereof towards a front edge to form a slope.

18. The disc cartridge storage case as set forth in claim 1, wherein the case member and lid member are integral with each other, a hinge which supports the lid member pivotably on the case member being made thinner from opposite lateral sides thereof towards the rear wall of the lid member.

19. The disc cartridge storage case as set forth in claim 1, wherein the lid member has provided on the top plate a marking indicating an inserting direction of the disc cartridge.

20. The disc cartridge storage case as set forth in claim 1, wherein the case member has formed therein a plurality of through-holes through which air is allowed to escape from inside the storage case when the disc cartridge is inserted into the storage case.

* * * * *

UNITED STATES PATENT AND TRADEMARK OFFICE
CERTIFICATE OF CORRECTION

PATENT NO. : 6,123,190  
DATED : September 26, 2000  
INVENTOR(S) : Kuboduka et al.

Page 1 of 1

It is certified that error appears in the above-identified patent and that said Letters Patent is hereby corrected as shown below:

<u>Column 17,</u>  
Line 9, change "an" to -- and --.

Signed and Sealed this

Eighth Day of January, 2002

*Attest:*

*Attesting Officer*

JAMES E. ROGAN  
*Director of the United States Patent and Trademark Office*